United States Patent [19]

Hambright

[11] Patent Number: 5,096,422
[45] Date of Patent: Mar. 17, 1992

[54] HANDICRAFT GUIDE

[76] Inventor: Perry N. Hambright, 23515 Oxnard St., Woodland Hills, Calif. 91367

[21] Appl. No.: 564,740

[22] Filed: Aug. 6, 1990

[51] Int. Cl.⁵ .............................................. G09B 19/20
[52] U.S. Cl. ........................................ 434/95; 434/81; 434/96
[58] Field of Search ................. 434/81, 84, 85, 87, 434/88, 89, 90, 95, 96, 165; 206/574, 575; 283/106

[56] References Cited

U.S. PATENT DOCUMENTS

| | | | |
|---|---|---|---|
| 532,110 | 1/1985 | Stockman | 434/95 |
| 819,877 | 5/1906 | Gilman | 434/165 X |
| 2,588,321 | 5/1950 | Hahn | 434/95 |
| 4,310,313 | 1/1982 | Brundige | 434/95 |
| 4,530,665 | 7/1985 | Colonel | 434/95 |
| 4,634,616 | 1/1987 | Musante et al. | 434/95 |

Primary Examiner—Richard J. Apley
Assistant Examiner—Karen A. Richard
Attorney, Agent, or Firm—Jack C. Munro

[57] ABSTRACT

A handicraft guide for locating a plurality of members on a surface, such as a layer of fabric, which utilizes a sheet material upon which has been inscribed a pattern to be reproduced as a design on the mounting surface. This mirror image pattern is made up of rows of symbols and is to be placed directly against the mounting surface. This guide is to be folded over upon itself sequentially exposing rows of symbols with each symbol to correspond to a specific member that is to be fixedly mounted on the mounting base directly adjacent the symbol. When there is placed on the mounting base a member for each symbol, there will be reproduced the desired design. The guide is then to be removed from the mounting base.

8 Claims, 1 Drawing Sheet

HANDICRAFT GUIDE

BACKGROUND OF THE INVENTION

The field of this invention relates to handicrafts and more particularly to a handicraft which is to reproduce a design onto a mounting base such as a layer of fabric of a shirt.

The utilization of handicrafts in conjunction with fabrics has long been known. Besides quilting, there is needlepoint, cross stitching and other handicrafts that are based on incorporating yarn of different colors in the form of stitches on the fabric. These stitches are to be arranged on the fabric in a specific arrangement forming a desired "picture."

Another way in which a desired "picture" could be achieved on fabric is by utilizing sequins in the form of small flat circular discs which are made in a wide variety of colors. Sequins can be placed on the fabric to form a particular design. The different colors can be utilized to denote certain features within that design. For example, a common design would be a domestic animal such as a dog, cat or bird. Also a specific design could be words.

The placing of a handicraft on fabric in a desired location generally has been accomplished by two methods. The first method is to have the design reproduced as a chart on graph paper with symbols being utilized to represent different colors. The crafter can duplicate that design onto the fabric by counting from the chart and reproducing the design by utilizing of the same count on the fabric.

The second method, sometimes referred to as the "no count" method, simply has the original design painted or printed directly onto the fabric. All the crafter has to do is cover the printed color (or color designated area) with the appropriate matching color of craft material. This method is far faster and easier than counting, but it cannot be used in many instances. If, for example, the fabric was black, the printing or painting might be very difficult to observe. Another reason for not utilizing the "no count" method would be that only preprinted fabric could be used, excluding the majority of fabric choices.

SUMMARY OF THE INVENTION

The subject matter of this invention relates to the construction of a guide to reproduce a handicraft on fabric and the method of utilizing that guide to reproduce the handicraft. The guide is constructed of sheet material such as paper. On the upper surface of the guide there are arranged rows of areas with each said area including indicia to denote a particular corresponding color of a craft material such as sequins. Incorporated within the guide and dividing each directly adjacent pair of rows is a score line. The pattern that is produced on the guide is a mirror image of the pattern that is to be reproduced on the fabric. The mirror image pattern is to be placed directly against the fabric with a portion of the guide to be folded back upon itself along one score line exposing a single row of indicia areas. Just prior to the folding back of the portion of the guide, a strip of adhesive tape is placed against the bottom edge of the guide to temporarily affix the guide to the fabric. The crafter is to then place a color sequin, corresponding to the color denoted by the area, onto the fabric directly adjacent the area with there being located a sequin for each area along the row. At this time a further portion of the guide is folded over upon itself along a second score line exposing a second row of areas. The sequin applying technique is repeated with this process continuing throughout the entire pattern of the guide resulting in the reproduction of the design and the forming of the actual desired image onto the fabric.

An objective of the present invention is to have a handicrafter reproduce designs on mounting surfaces that do not already have the pattern directly on the fabric prior to the forming of the handicraft itself.

Another objective of the present invention is to permit usage of any color of fabric upon which the design is to be reproduced, including black fabric, which does not easily facilitate the preprinting of patterns used in other methods.

Another objective of the present invention is that there is no need to use fabric with a gridded construction in order to reproduce designs correctly, such a needlepoint canvas, which provides a predetermined set of rows for color bits to align to.

Another objective of the present invention is that this invention can not only be used for sequins but can be utilized for other handicrafts such as needlework, mosaic tile pictures or anything which requires reproduction of a design by bits of color in a grid array.

DETAILED DESCRIPTION OF THE SHOWN EMBODIMENT

Figure 1:
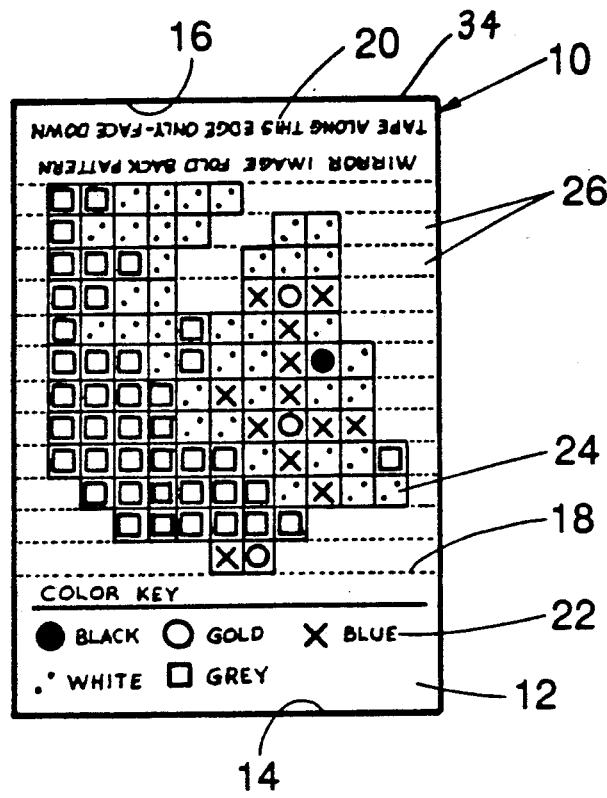
FIG. 1 is a top, plan view of the handicraft guide of the present invention.

Referring particularly to the drawing there is shown the handicraft guide 10 of this invention. The guide 10 is basically rectangular in shape resembling a sheet of paper defined as the body 12. The body 12 is shown to be of a basic rectangular configuration. However, the body 12 could be constructed in any desirable shape with it not being necessary to be restricted only to the rectangular configuration shown.

The body 12 has an upper surface which is divided into a color key area 14 and an instructional area 16. The color key area 14 is located directly adjacent one edge of the body 12 with the instructional area 16 being located directly the opposite edge 34 of the body 12. Located between areas 14 and 16 are a series of score lines 18. These score lines 18 are parallel to each other and are evenly spaced apart between the areas 14 and 16. Each score line 18 actually includes a series of spaced apart tiny holes placed within the body 12.

Within the instructional area 16 is located a series of words defining a set of instructions 20. These instructions are to instruct the crafter as to how to use the guide 10 of this invention. Within the area 14 there is imprinted a color key which shows a series of symbols with each symbol to represent a particular color. The purpose of the color key will be explained further on in this specification.

Within each row 26, which is defined as being between each directly adjacent pair of score lines 18, there is imprinted a plurality of areas 24. Each area 24 is identical in size and is shown to be square in shape. However, the square shape can be varied without departing from the scope of this invention. Imprinted within each area 24 is indicia that corresponds to the color key 22. For example, the color key shows black as a dark circle. Therefore, within any area 24 in which it is desired to show as black that dark circle is to be so located. The rows 26, cooperate to produce a mirror image of the handicraft that is ultimately to be reproduced by sequins 30 on the fabric 32.

Figure 2:
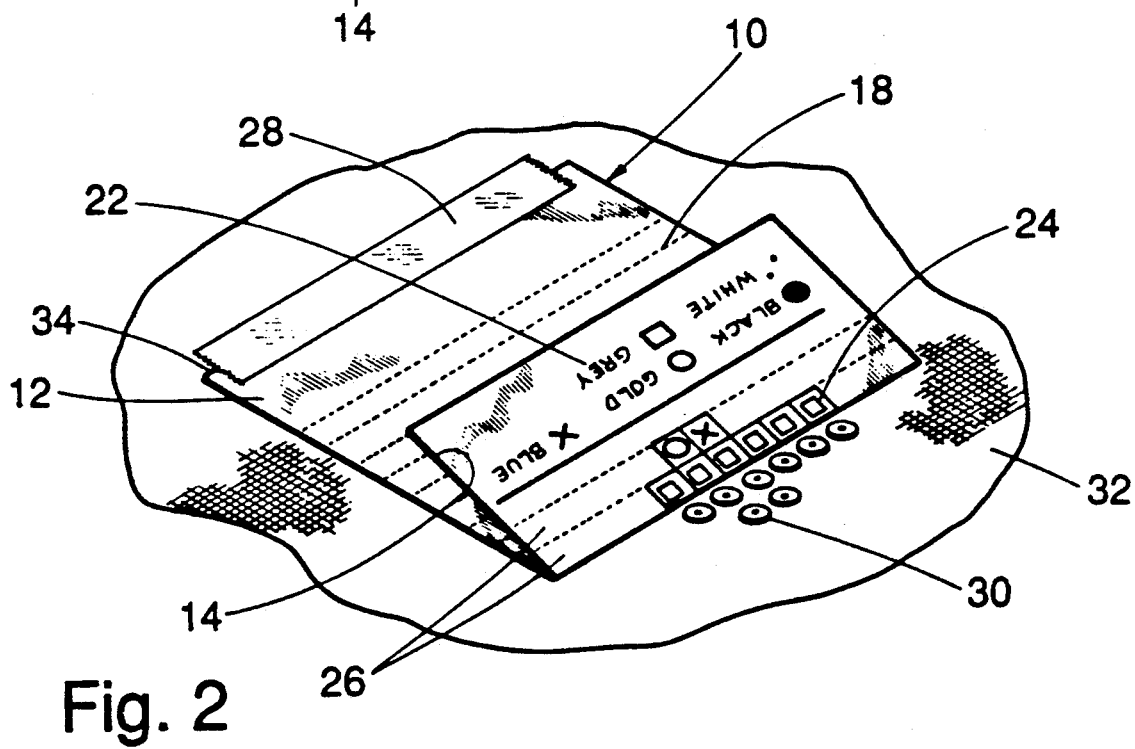
FIG. 2 is an isometric view of the handicraft guide of the present invention showing the guide being used on a section of fabric in order to reproduce a design of the fabric.

Placed against the opposite edge 34 of the body 12 and on the lower surface of the body 12 is a strip 28 of adhesive tape. The crafter is to place the upper surface of the body 12 directly against the fabric 32 as is clearly shown in FIG. 2 of the drawing. The strip 28 is then to be applied as shown in FIG. 2 to the body 12 of the guide 10. The crafter is to select the particular area on the fabric 32 where the guide 10 is to be placed. The strip 28 temporarily mounts in position the guide 10. The crafter then proceeds to fold the top portion of the body 12 over upon itself along a score line 18 exposing a single row 26. Within the drawing, the first row shows two in number of areas 24 with one of these areas including indicia for gold color and the other including indicia for blue color. On the fabric 32 directly adjacent the gold denoted area 24, there is to be mounted a gold sequin 30. The sequins 30 can be mounted by any method, including but not limited to, sewing or gluing onto fabric 32. Directly adjacent the remaining area 24, there is to be adhesively secured to the fabric 32 a blue sequin 30. The crafter then proceeds to fold the body 12 to the sequentially next in the series of score lines 18. This will then expose six in number of areas 24. It happens to be that each of these areas 24 are to correspond to a grey color sequin 30 and such grey colored sequins 30 are to be secured onto the fabric 32.

This process is to be repeated for each row 26 with the result of producing an image in sequins on the fabric 32. Once the desired image has been obtained, normally the guide 10 will be removed from the fabric 32 and discarded. However, guide 10 could be reused if such is deemed to be desired by the crafter.

What is claimed is:

1. A handicraft guide for locating in a specific array a plurality of members on a mounting surface, said members being divided into groups, each said member of each said group being identical, each said member of each said group including separate individual identifying first indicia with said first indicia of each said group being different, said handicraft guide comprising:
   a thin sheet material base having an upper surface and a lower surface, said upper surface having inscribed thereon a series of separate identifying areas, a said area to correspond to a said member, each said area to include separate second indicia, said second indicia of a said area to correspond to a said group; and
   said areas being arranged in rows on said base, score lines included within said base dividing said rows, whereby said upper surface is to be placed directly against said mounting surface and by folding a portion of said base along a said score line there will be exposed a said row, and whereby a said member is to be placed on said mounting surface for each said area and directly adjacent each said area according to said second indicia which is to correspond with said first indicia.

2. A handicraft guide for locating in a specific array a plurality of members on a mounting surface, said members being divided into groups, each said member of each said group being identical, each said member of each said group including individual identifying first indicia with said first indicia of each said group being different, said handicraft guide comprising:
   a thin sheet material base having an upper surface and a lower surface, said upper surface having inscribed thereon a series of identifying areas, a said area to correspond to a said member, each said area to include second indicia, said second indicia of a said area to correspond to a said group;
   said areas being arranged in rows on said base, score lines included within said base dividing said rows, whereby said upper surface is to be placed directly against said mounting surface and by folding a portion of said base along a said score line there will be exposed a said row, and whereby a said member is to be placed on said mounting surface for each said area and directly adjacent each said area according to said second indicia which is to correspond with said first indicia; and
   said areas being arranged in a specific manner forming a mirror image of the resulting design of the handicraft that is to be reproduced on said mounting surface.

3. The handicraft guide as defined in claim 2 wherein; said first indicia comprising a plurality of colors.

4. The handicraft guide as defined in claim 3 wherein; each said area being polygonal in shape, each said member being circular in configuration.

5. The handicraft guide as defined in claim 4 wherein; a strip of adhesive tape being attached to said lower surface, said adhesive tape to be utilized to temporarily fix in position said base onto said mounting surface.

6. The handicraft guide as defined in claim 1 wherein; said score lines being parallel with the distance between directly adjacent said score lines being equal.

7. The method of producing a handicraft constructed of a plurality of different colored members being fixed onto a mounting base in a specific pattern comprising the steps of;
   utilizing a guide upon which is inscribed a plurality of areas with each said area to correspond to a particular color of said members and said areas being arranged in a mirror image arrangement of the pattern that is to be produced on said mounting base;
   placing of said guide on said mounting base with said areas being located directly against said mounting base and not exposed;
   folding back a portion of said guide to expose a first row of said areas;
   placing and fixing of said member on said mounting base directly adjacent its corresponding said area and repeating this placing and fixing procedure for the entire said first row;
   folding back a further portion of said guide to expose a second row of said areas;
   placing and fixing of a said member on said mounting base directly adjacent its corresponding said area and repeating this placing and fixing procedure for the entire said second row; and
   proceeding with repeating said folding back step and said placing and fixing step until there has been mounted on said mounting base a said member each said area.

8. The method as defined within claim 7 wherein after said placing of said guide and before said first folding back step there is performed the following step:
   temporarily fixing said guide on said mounting base.

* * * * *